(12) United States Patent
Lange

(10) Patent No.: US 6,934,910 B2
(45) Date of Patent: Aug. 23, 2005

(54) METHOD AND SYSTEM FOR INSERTING A DATA OBJECT INTO A COMPUTER-GENERATED DOCUMENT USING A TEXT INSTRUCTION

(75) Inventor: Thomas Lange, Hamburg (DE)

(73) Assignee: Sun Microsystems, Inc., Santa Clara, CA (US)

(*) Notice: Subject to any disclaimer, the term of this patent is extended or adjusted under 35 U.S.C. 154(b) by 792 days.

(21) Appl. No.: 09/728,793

(22) Filed: Nov. 30, 2000

(65) Prior Publication Data

US 2001/0007109 A1 Jul. 5, 2001

(30) Foreign Application Priority Data

Dec. 14, 1999 (EP) .............................................. 99124950

(51) Int. Cl.[7] .............................................. G06F 17/24
(52) U.S. Cl. ...................................... 715/538; 715/531
(58) Field of Search ............................... 715/530, 531, 715/538

(56) References Cited

U.S. PATENT DOCUMENTS

| | | | | |
|---|---|---|---|---|
| 5,251,292 A | * | 10/1993 | Martel et al. ................ | 715/538 |
| 5,680,638 A | * | 10/1997 | Satoh .......................... | 715/538 |
| 5,850,629 A | * | 12/1998 | Holm et al. ................. | 704/260 |
| 6,610,106 B1 | * | 8/2003 | Jenks .......................... | 715/538 |

FOREIGN PATENT DOCUMENTS

JP          04/256163       9/1992

OTHER PUBLICATIONS

Camarda, et al., Special Edition Using Microsoft Word 2000; Ch. 26—"Word and Office Multilingual Features" and "Entering Asian Text with Input Method Editors"; and Ch. 29—"Using Equation Editor 3.0" (Que Publishing, May 6, 1999).*

Tittel, Ed et al., HTML 4 for Dummies, IDG Books Worldwide, Inc. (1998).*

Aitken, Peter, Sams Teach Yourself Microsoft Word 2000, Sams Publishing (Apr. 28, 1999).*

Araac O. et al; "The Design of a Customizable Component to Display and Edit Formulas"; Proceedings of the 1999 International Symposium on Symbolic and Algebraic Computation; Jul. 29–31, 1999; XP000937474; pp. 283–290.

* cited by examiner

Primary Examiner—Heather R. Herndon
Assistant Examiner—Doug Hutton
(74) Attorney, Agent, or Firm—Gunnison, McKay & Hodgson, L.L.P.; Forrest Gunnison

(57) ABSTRACT

For inserting a data object as for example a mathematical formula or special characters like Greek characters into a text document, instruction symbols representing the data object are inputted in the form of text characters into the text document. A text portion containing instruction symbols is selected, and the instruction symbols contained in the selected text portion are converted into a data object represented by the instruction symbols. The invention allows rapid input of data objects into the text document, in particular simple mathematical formulae or single special characters without entering a formula editor or the like.

18 Claims, 5 Drawing Sheets

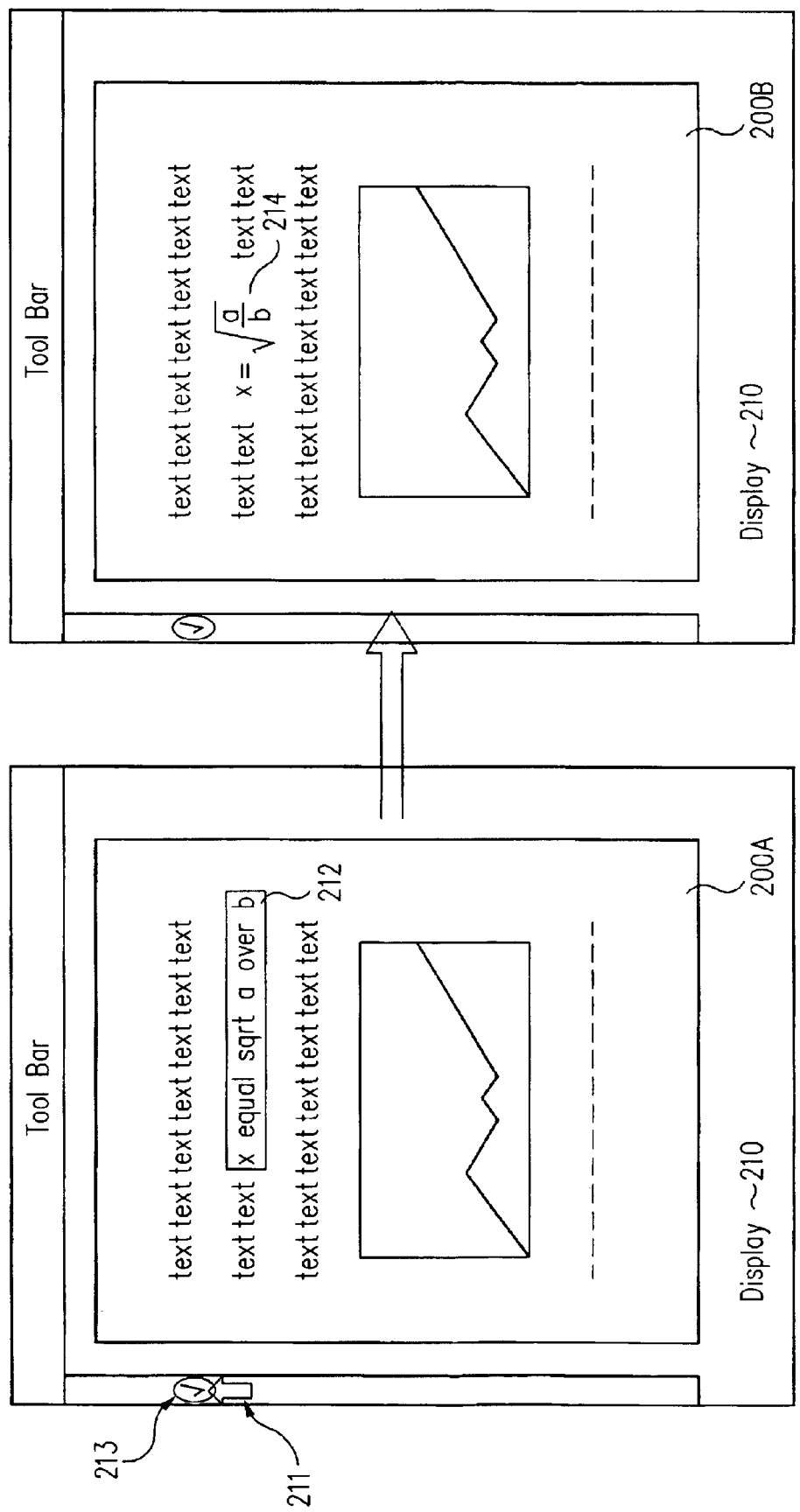

METHOD AND SYSTEM FOR INSERTING A DATA OBJECT INTO A COMPUTER-GENERATED DOCUMENT USING A TEXT INSTRUCTION

BACKGROUND OF THE INVENTION

1. Field of the Invention

The present invention relates generally to generating documents using a computer application, and in particular to inserting a data object like a mathematical formula or special characters like Greek characters into a computer-generated document as for example a text document.

2. Description of Related Art

Computer word processing applications typically are used to generate a document, referred to as a computer-generated document, that may contain text data, tables, diagrams, etc. and often mathematical formulae or special characters like Greek characters. Mathematical formulae and special characters are particularly important for documents like scientific articles and the like. Similarly, HTML Web page generators generate a document that is effectively a text-based document.

For creating a mathematical formula within a text document 100 (FIG. 1), so called formula editors were used. Typically, the formula editor was opened from within the computer word processing application by clicking on a menu bar icon, or alternatively using a menu.

The formula editor contained a large number of displayed key fields and list boxes representing different elements of mathematical formulae like brackets, integrals, fraction bars, matrices, so forth. For inserting special characters, like for example the Greek character Σ, it was necessary to enter a list box containing the special characters.

The user created the desired formula 101 using these keys and list boxes. After having completed the formula, the user returned to the original document and pasted the formula as an imported object into the document. If the user recognized an error in the formula, the user again opened the formula editor, corrected the error, and returned to the original document.

Using a formula editor, it was possible to create nearly every desired mathematical formula; however, the operation was complicated and time consuming in particular for simple formulae like simple fractions or square roots, which appeared frequently in a text document. Editing of the formula always required entering the formula editor and subsequently returning into the original document.

To simplify the entry of formulas, some formula editors permitted the use of script like phrases that the formula editor converted to the corresponding mathematical expression. However, while this assisted in entering a formula in some situations by minimizing the use of key fields and list boxes, the general problem of having to utilize the formula editor persisted.

In an attempt to minimize some of the entry and exit issues, it was known to select an insert option from a menu bar of an application and the formula editor capability was opened so that the user could insert and edit a formula without leaving the application, only the menus and the object bars were changed. After the formula editor capability was used to enter the data object, double clicking on the embedded object launched the formula editor capability so that the formula could be edited. Again, this was done without leaving the application.

SUMMARY OF THE INVENTION

According to the principles of this invention, inserting or editing a data object like a mathematical formula or special character in a computer-generated document is facilitated and sped up in comparison to the prior art methods that required use of a formula editor. A method of inserting a data object into a computer-generated document includes inputting instruction symbols representing the data object into the document in the form of text characters, selecting the document portion containing instruction symbols, and converting the instruction symbols contained in the selected document portion into a data object represented by the instruction symbols.

With the present invention it is possible to input the data object, which may be a mathematical formula or a Greek, Chinese, Korean, Cyrillic, Arabic, Hebrew, or Japanese character, or any other character or symbol, and which can be represented by certain instruction symbols, into the document using standard characters, which are also used for creating a text document. The user does not need to leave the document and can input the instruction symbols in the same way as the text characters, for example by typing on a keyboard.

If the selected document portion contains characters, which are not part of an instruction these characters remain unchanged during the converting operation. Those unchanged characters may be variables like a, b, or x in a mathematical formula.

In one embodiment, the converted data object is inserted into the document at the position of the selected document portion. The inserted data object is formatted depending on a surrounding content, for example, the same as the format of text in the same line. The inserted data object is automatically stored with the document in this embodiment. The inserted data object is reconvertible into the original document portion for editing purposes.

The document portion including the instruction symbols may be input by means of speech decoding. In this case, the present invention is particularly advantageous since the instruction symbols (in contrast to the mathematical symbol itself) may be expressed orally.

One embodiment of the invention allows fast and easy generation and editing of a data object like a mathematical formula or special characters. This is particularly useful for simple and short data objects and for data objects, which the user needs frequently and for which the user easily memorizes the instruction symbols representing these data objects. For inserting the object, the user needs not to enter a special tool like a formula editor and then return to the original document. Another advantage of the present invention is that it allows the input of the data objects by speech decoding since the instruction symbols can be expressed orally.

Another embodiment of the invention provides a computer program for inserting, on a computer, a data object into a document, comprising inserting instruction symbols representing the data object in the form of text characters into the document, selecting a document portion containing instruction symbols, and converting the instruction symbols contained in the selected document portion into the data object represented by the instruction symbols.

Program code may be embodied in any form of a computer program product. A computer program product comprises a medium configured to store or transport computer readable code, or in which computer readable code may be embedded. Some example of computer program products are CD-ROM discs, ROM cards, floppy discs, magnetic tapes, computer hard drives, servers on a network and signals transmitted over a network representing computer readable program code.

According to a still further embodiment, the present invention provides a software tool providing instructions for inserting a data object into a computer-generated document by inserting instruction symbols inputted in the form of text characters and representing the data object into the document, converting instruction symbols contained in a selected document portion into the data object represented by the instruction symbols, inserting the converted data object into the document, and providing signals for displaying the document including the converted data object.

According to another embodiment, the present invention provides a computer-generated document including a data object generated by a conversion of instruction symbols inputted in the form of text characters, wherein the data object is reconvertible into the instruction symbols.

BRIEF DESCRIPTION OF THE DRAWINGS

FIG. 2A is an example of a text document containing instruction symbols representing a data object according to the present invention.

FIG. 2B is a schematic representation of the text document shown in FIG. 2A after conversion of a data object.

DETAILED DESCRIPTION

According to the principles of this invention, a user enters a formula in a computer-generated document by simply typing in text representing the formula and selecting this text. In response to the selection of the text representing the formula, the text representing the formula is automatically converted to a mathematical formula and inserted in the computer-generated document as a data object.

Consequently, with this invention, a user generating a document on a computer no longer has to continually open a formula editor to enter a formula. Rather, the user simply continues to input text information in the same form as the rest of the document including text that describes the formula. Similarly, a user can type in text representing a special character, e.g., a Greek, Chinese, Korean, Cyrillic, Arabic, Hebrew, or Japanese character, or any other character or symbol, and use the method of this invention to automatically convert the text representing the special character to a data object that is inserted in the computer-generated document.

Figure 1:
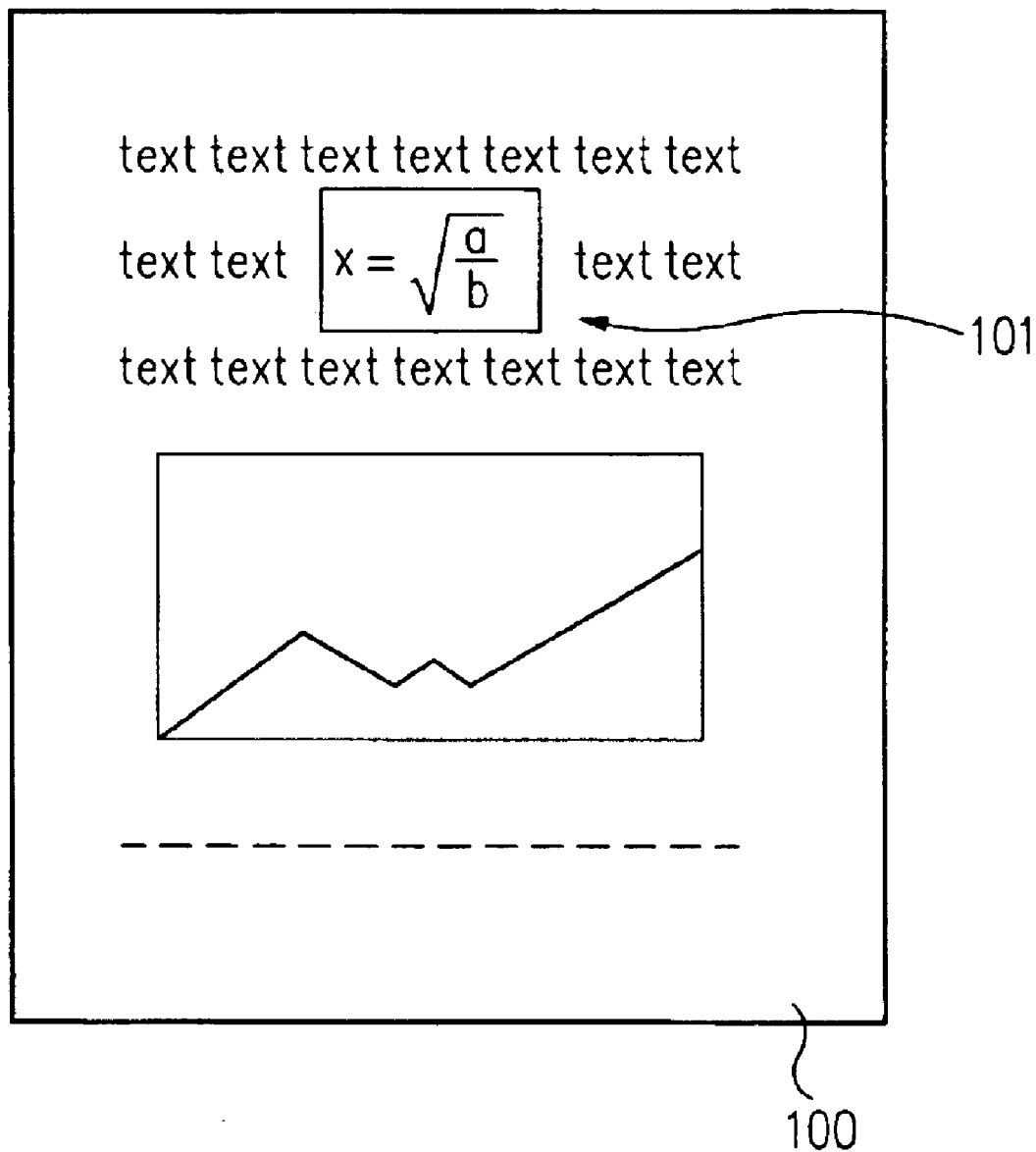
FIG. 1 is a schematic representation of a prior art document containing a mathematical formula.
Figure 2C:
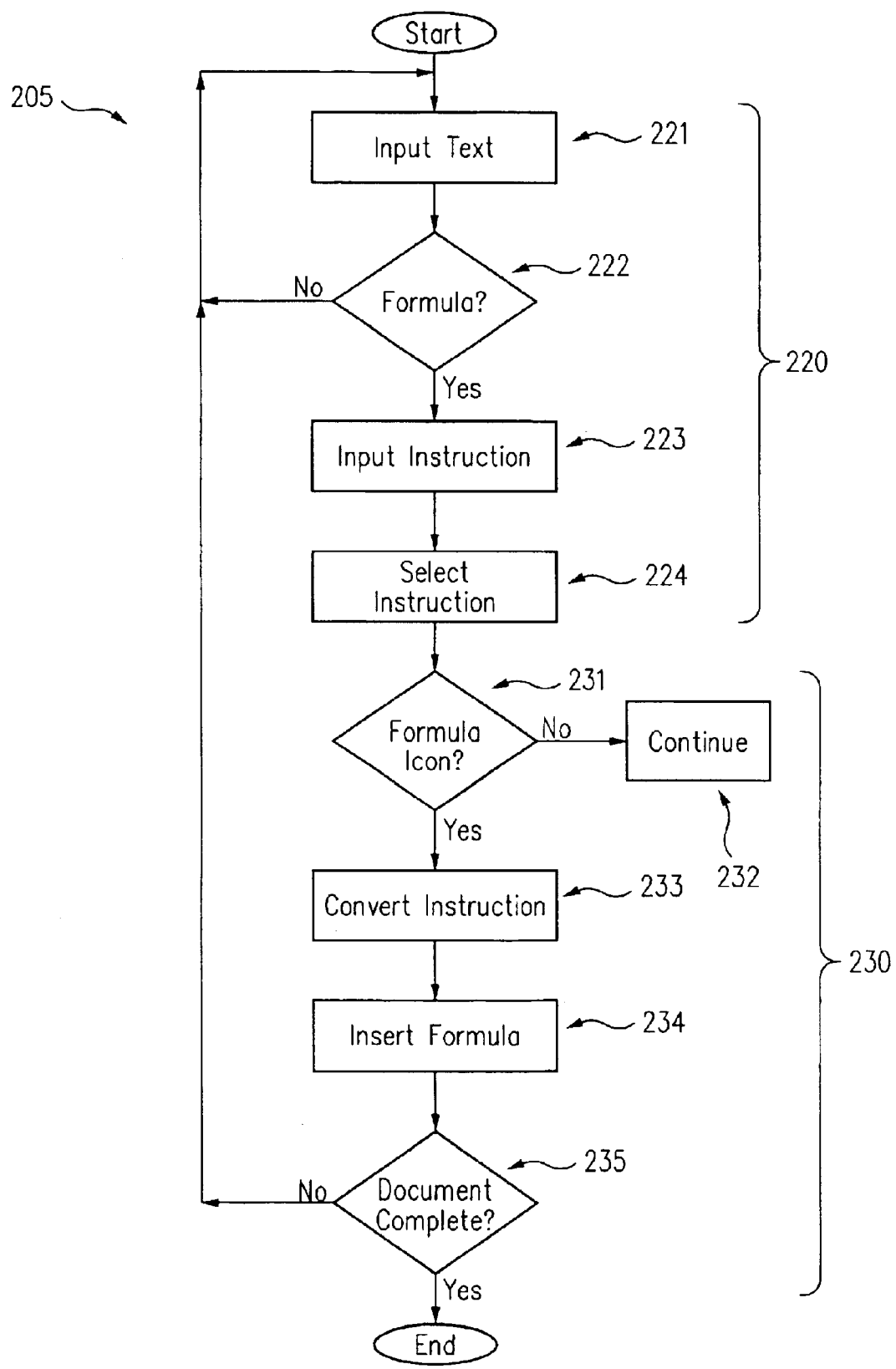
FIG. 2C is a process flow diagram for the method of the present invention.

According to the principles of this invention, in a text-based formula generation method 205, a user inputs text in an input text operation 221 (FIG. 2C) into a computer-generated document 200A (FIG. 2A), which is displayed on a display screen 210 by an application 319 (FIG. 3A) executing on a computer processor 312C. In operation 221, (FIG. 2C) the user inputs the text using, for example, a keyboard in input units 320C (FIG. 3A) of a computer system 300C, which is representative of a computer system input device. The text, however, can be input using another suitable input technique and/or input device, e.g. voice recognition processing or the like.

Input text operation 221 transfers to formula check operation 222. If the user does not want to input a formula, formula check operation 222 returns to input text operation 221. Conversely, if the user wants to input a formula into document 200A, formula check operation 222, which is carried out by the user, transfers to input instruction operation 223.

In input instruction operation 223, the user inputs the formula using text instruction symbols via one of input units 320C. For example, as illustrated in FIG. 2A, the user inputs the text portion "x equal sqrt a over b", which includes the text instruction symbols, equal, sqrt, and over. The user is not required to change modes of input, and is not required to access a formula editor and type the formula into the editor, but rather the user simply continues inputting characters in a conventional fashion.

After completing the text input for the desired formula in input instruction operation 223, the user selects the text formula instruction in select instruction 224. In this embodiment, the user first highlights text formula instruction 212 and then moves cursor 211 to an equation icon 213. With cursor 211 on equation icon 213 and with text formula instruction 212 highlighted, the user clicks a mouse button to complete select instruction operation 224. In more general terms, select instruction operation 224 identifies a text formula instruction 212 for a generate formula method 230. Operations 221 to 224 form a text formula instruction generation and identification method 220.

In generate formula method 230, formula check operation 231 determines whether the user selected a text formula instruction. In this embodiment, check operation 231 determines whether the user clicked on equation icon 213. If the user selected a text formula instruction, check operation 231 transfers to convert instruction operation 233 and otherwise to continue operation 232. In one embodiment, check operation 231 is part of an event handler of application 319, and if the event is not a text formula instruction selection input, event handling continues in continue operation 232 and the application continues as in the prior art.

However, if a text formula instruction selection input event occurred, processing transfers to convert instruction operation 233. Convert instruction operation 233 cuts the selected text formula instruction and pastes the selected text formula instruction into a call to a formula editor that can process the text formula instruction. For example, a prior art formula editor is modified to receive a text formula instruction and output a data object that is a corresponding formula. The modified formula editor executes in the background and the user is unaware of its existence. Upon the modified formula editor returning a data object, which in this example is a mathematical formula $$x = \sqrt{\frac{a}{b}},$$

combinations of characters in the text formula instruction, which do not represent text instruction symbols, like the variables x, a and b in this example, remain unchanged. Hence, the creation of a formula containing variables is possible. Upon return of the mathematical formula, i.e., the data object, processing transfers from convert instruction operation 233 to insert formula operation 234.

In insert formula operation 234, the data object, i.e., formula 214, is inserted in document 200B at the location from which the text formula instruction sequence was cut, and is displayed on display unit 210. Preferably, the formula is formatted like the surrounding text so that the visual appearance of text document 200B containing the formula is optimized. However, in one embodiment, the user can include text instructions to format any part, or all of the formula in a specific format, which may be different from the format of the surrounding text.

Following insert formula operation 234, document complete check operation 235 determines whether the user has entered an instruction to indicate the document is complete. If a document complete instruction has been issued, the finished document is saved. Preferably, the inserted data object is stored together with the text document in a memory, e.g., memory 311B, which is this case is located in a file server 300B. If the document is not complete, check operation 235 returns to input text operation 221.

Those of skill in the art will appreciate that the method of this invention can be multithreaded. For example, one thread permits the user to continue entering additional text, while another thread executes the text formula instruction. Also, as illustrated in FIGS. 2A and 2B, the content of a text document 200A, may include in addition to the text data also other data like diagrams, graphics or tables. The text document also may be, for example, an HTML- or XML-document. In addition, the present invention is not restricted to text documents.

Hence, according to the principles of this invention, if a user wishes to input a special data object like a formula into the text document, the user enters the formula in the form of a text formula instruction that includes text instruction symbols and variables. For example, the formula $$\frac{a}{b}$$

is represented by "a over b". Here, the characters "a" and "b" represent variables and "over" is a text instruction symbol representing a fraction bar. Other examples of text formula instructions are "sqrt a" for $\sqrt{a}$, "3 ind 1" for $3_1$ and "int (a,b) Omega dt" for $$\int_a^b \Omega dt.$$

From the last example, it is obvious that the present invention is also very useful for inserting special characters like Greek characters into a text document. "pi" may represent the Greek character $\pi$, "alpha" may represent $\alpha$ or "lambda" may represent $\lambda$. It is also possible to distinguish between small and capital letters, "Lambda" may for example represent $\Lambda$. It is immediately apparent that typing the instruction symbols is in many cases much easier and faster than using a special program like a formula editor or a list box for Greek symbols. The same can apply to other special characters like Chinese, Korean, Cyrillic, Arabic, Hebrew, or Japanese characters, or any other character or symbol characters. In another embodiment, a character, e.g., a percent sign, is used before the name of the character to assist in distinguishing between when the user wants the text word, and when the user wants the Greek or other symbol.

Table 1 lists a number of different formula symbols that can be generated in using a text formula instruction. Notice that in each instance, the text formula instruction utilizes only characters that are found on a conventional computer keyboard. The last column in a row of Table 1 gives a simple example of a text instruction for a formula that utilizes the symbol presented in the first column of the row. In the last column, a, b, x, y, and z are used as variables. The text instruction symbol is in a bold font.

TABLE 1

| Symbol Presented in Formula | Type | Description | Example of text formula instruction |
| --- | --- | --- | --- |
| + | Unary operator | Plus Sign | +a |
| − | Unary operator | Minus Sign | −a |
| ± | Unary operator | Plus Minus Sign | plusminus a |
| ∓ | Unary operator | Minus Plus Sign | minusplus a |
| ¬ | Unary operator | Logical negation | neg a |
| \|□\| | Unary operator/ function | Absolute value | abs a |
| ! | Unary operator/ function | Factorial | fact a |
| √ | Unary operator/ function | Square root | sqrt a |
| $\sqrt[n]{}$ | Unary operator/ function | n-th root | nroot n a -- where n is the desired nth root of a |
|  | Unary operator | User-defined operator | uoper % theta x |
| = | Binary operator/ relation | Equal | a = b |
| ≠ | Binary operator/ relation | Not equal | a neq b, or a <> b |
| + | Binary operator | Addition | a + b |
| ⊕ | Binary operator | Add symbol in circle | a oplus b |
| − | Binary operator | Substraction | a − b |
| ⊖ | Binary operator | Subtract symbol in circle | a ominus b |
| * | Binary operator | Multiply | a * b |
| · | Binary operator | Dot product | a cdot b |
| ⊙ | Binary operator | Dot product in a circle | a odot b |
| × | Binary operator | Multiplication | a times b |
| ⊗ | Binary operator | Multiply symbol in circle | a otimes b |
| / | Binary operator | Division | a / b |
| / | Binary operator | Slash for quotient set between two characters | a slash b slash c |
| □/□ | Binary operator | Slash between two characters, of which the left character is superscript, and the right is subsript | a wideslash b |

TABLE 1-continued

| Symbol Presented in Formula | Type | Description | Example of text formula instruction |
|---|---|---|---|
| $\square\backslash\square$ | Binary operator | Back Slash between two characters, of which the right character is superscript, and the left subscript | a widebslash b |
| ⊘ | Binary operator | Slash in circle | a odivide b |
| ÷ | Binary operator | Division | a div b |
| $\frac{a}{b}$ | Binary operator | Division/ Fraction | a over b |
| ∧ | Binary operator | Logical AND | a and b, or a & b |
| ∨ | Binary operator | Logical Or | a or b, or a \| b |
| ○ | Binary operator | Concatenate | a circ b |
| \| | Binary operator | Divides | 5 divides 30 |
| ∤ | Binary operator | Does not Divide | 7 ndivides 30 |
| > | Binary operator/ Relation | Greater than | a gt b, or a > b |
| < | Binary operator/ Relation | Less than | a le b, or a < b |
| ≧ | Binary operator/ Relation | Greater than or equal to | a gt b, or a >= b |
| ⪰ | Binary operator/ Relation | Greater than-equal to | a gtslant b |
| ≫ | Binary operator/ Relation | Much greater than | a gg b, or a >> b |
| ≦ | Binary operator/ Relation | Less than or equal to | a le b, or a <= b |
| ⪯ | Binary operator/ Relation | Less than-equal to | a leslant b |
| ≪ | Binary operator/ Relation | Much less than | a ll b, or a << b |
| $\underset{=}{\text{def}}$ | Binary operator/ Relation | Is defined as/ by definition equal to | a def b |
| ≡ | Binary operator/ Relation | Is equivalent/ congruent to | a equiv b |
| ≈ | Binary operator/ Relation | Is approximately | a approx b |
| ∼ | Binary operator/ Relation | Is similar to | a sim b |
| ≃ | Binary operator/ Relation | Is similar or equal to | a simeq b |
| ∝ | Binary operator/ Relation | Is proportional to | a prop b |
| ⊥ | Binary operator/ Relation | Is orthogonal to | a ortho b |
| \|\| | Binary operator/ Relation | Is parallel to | a parallel b |
| ●—○ | Binary operator/ Relation | Correspondence symbol image of | a transl b |
| ○—● | Binary operator/ Relation | Correspondence symbol original of | a transr b |
| ∈ | Binary operator/ Set operator | Is contained in | a in b |
| ∉ | Binary operator/ Set operator | Is not contained in | a notin b |
| ⊂ | Binary operator/ Set operator | Subset | a subset b |
| ⊆ | Binary operator/ Set operator | Subset or equal to | a subseteq b |
| ⊄ | Binary operator/ Set operator | Not subset to | a nsubset b |
| ⊈ | Binary operator/ Set operator | Not subset or equal to | a nsubseteq b |
| ⊃ | Binary operator/ Set operator | Superset | a supset b |
| ⊇ | Binary operator/ Set operator | Superset or equal to | a supseteq b |
| ⊅ | Binary operator/ Set operator | Not superset to | a nsupset b |
| ⊉ | Binary operator/ Set operator | Not superset or equal to | a nsupseteq b |
| ∋ | Binary operator/ Set operator | Contains | a owns b, or a ni b |
| ∪ | Binary operator/ Set operator | Union of Sets | a union b |
| ∩ | Binary operator/ Set operator | Intersection of Sets | a intersection b |
| \ | Binary operator/ Set operator | Difference between Sets | a setminus b, or a bslash b |
| $X_n$ | Binary operator | x with index n | x sub n |
| $X^n$ | Binary operator | n-th power of x | x sup n |
| → | Binary operator/ Relation | Toward | a toward b |
|  | Binary opeator | User defined binary operator | x boper % theta y --used to insert greek character theta |
| Σ | Operator | Sum | Sum x sub i |
| Π | Operator | Product | prod x sub i |
| ⨿ | Operator | Coproduct | coprod x sub I |
| lim | Operator | Limit | lim x toward infinity |
| lim inf | Operator | Limit inferior | liminf |
| lim sup | Operator | Limit superior | limsup |
| ℏ | Operator/ Physics | Physics Constant | hbar |
| ƛ | Operator/ Physics | Physics Constant | lambdabar |
| ∃ | Operator/ Logic | Existential quantifier, there is at least one | a exists b |

TABLE 1-continued

| Symbol Presented in Formula | Type | Description | Example of text formula instruction |
|---|---|---|---|
| ∀ | Operator/Logic | Universal quantifier, for all | a forall b |
| ⇐ | Operator/Logic | Arrow with double line to the left | a drarrow b |
| ⇒ | Operator/Logic | Arrow with double line to the right | a drarrow b |
| ⇔ | Operator Logic | Arrow with double line to the left and to the right | a dlrarrow b |
| ↑ | Operator | Up arrow | a uparrow b |
| ↓ | Operator | Down arrow | a downarrow b |
| ← | Operator | Left arrow | a leftarrow b |
| → | Operator | Right arrow | a rightarrow b |
| ∫ | Operator | Integral | in xdx |
| ∫∫ | Operator | Double Integral | iint f (x,y) dxdy |
| ∫∫∫ | Operator | Triple Integral | iiint f (x,y,z) dxdydz |
| ∮ | Operator | Curve integral | lint |
| ∯ | Operator | Double curve integral | llint |
| ∰ | Operator | Triple curve integral | lllint |
| | Operator | User defined operator | oper % union from {i = 1} to n x_{i} |
| | Operator | Range from . . . to | from {i = 1} to n |
| | Operator | Lower limit of an operator | from {i = 1} |
| | Operator | Upper limit of an operator | to n |
| sin() | Function | Sine | sin x |
| cos() | Function | Cosine | cos x |
| tan() | Function | Tangent | tan x |
| cot() | Function | Cotangent | cot x |
| arcsin() | Function | Arcsine | arcsin x |
| arccos() | Function | Arccosine | arccos x |
| arctan() | Function | Arctangent | arctan x |
| arccot() | Function | Arccotangent | arccot x |
| sinh() | Function | Hyperbolic sine | sinh x |
| cosh() | Function | Hyperbolic cosine | cosh x |
| tanh() | Function | Hyperbolic tangent | tanh x |
| coth() | Function | Hyperbolic cotangent | coth x |
| arsinh() | Function | Area hyperbolic sine | arsinh x |
| arcosh() | Function | Area hyperbolic cosine | arcosh x |
| artanh() | Function | Area hyperbolic tangent | artanh x |
| arcoth() | Function | Area hyperbolic cotangent | arcoth x |
| exp() | Function | General exponential function | exp x |
| ln | Function | Natural logarithm | ln x |
| log | Function | Logarithm base 10 | log x |
| $e^{\square}$ | Function | Natural exponential function | func ^{x} |
| ℕ | Mathematical symbol | Natural number | setn a |
| ℤ | Mathematical symbol | Integer | setz a |
| ℚ | Mathematical symbol | Rational number | setq a |
| ℝ | Mathematical symbol | Real number | setr a |
| ℂ | Mathematical symbol | Complex number | setc a |
| ℵ | Mathematical symbol | Cardinal number | aleph a |
| ϶ | Mathematical symbol | back epsilon | backepsilon |
| ∅ | Mathematical symbol | Empty set | emptyset |
| ℜ | Mathematical symbol | Real part of a complex number | re a |
| ℑ | Mathematical symbol | Imaginary part of a complex number | im a |
| ∞ | Mathematical symbol | Infinity | infinity, or infty |
| ∇ | Mathematical symbol | Nabla vector | nabla x |
| ∂ | Mathematical symbol | Partial differentiation or set margin | partial x |
| ℘ | Mathematical symbol | p function | wp |
| ... | Other symbol | Three dots vertically in the symbol center | dotsaxis |
| ⋰ | Other symbol | Three dots diagonally from lower left to upper right | dotsup, or dotsdiag |
| ⋱ | Other symbol | Three dots diagonally from upper right to lower left | dotsdown |
| ... | Other symbol | Three dots horizontally below | dotslow |
| ⋮ | Other symbol | Three dots vertical | dotsvert |
| □ | Other symbol | Placeholder | <?> |
| () | Bracket with grouping function | Normal round left and right brackets | (a over b) oplus c |
| [] | Bracket with grouping function | Normal left and right square brackets | [a over b] oplus c |
| [[ ]] | Bracket with grouping function | Left and right double square brackets | icibracket . . . rdbracket |
| {} | Bracket with grouping function | Left and right curly brackets, set bracket | ibrace . . . rbrace |
| ⏜ | Bracket with grouping function | Scalable curly set bracket on top | . . . overbrace . . . |
| ⏝ | Bracket with grouping function | Scalable curly set bracket below | . . . underbrace . . . |
| <> | Bracket with grouping function | Left and right pointed brackets | langle . . . rangle |
| <|> | Bracket with grouping function | Left and right pointed operator brackets | langle . . . mline . . . rangle |

TABLE 1-continued

| Symbol Presented in Formula | Type | Description | Example of text formula instruction |
|---|---|---|---|
| <\|> | Bracket with grouping function | Scalable left and right pointed operator brackets | left langle . . . mline . . . right rangle |
| \| \| | Bracket with grouping function | Left and right vertical lines | lline . . . rline |
| \|\| \|\| | Bracket with grouping function | Left and right double lines | ldline . . . rdline |
| ⌊ ⌋ | Bracket with grouping function | Left and right lines with lower edges | lfloor . . . rfloor |
| ⌈ ⌉ | Bracket with grouping function | Left and right lines with upper edges | lceil . . . rceil |
|  | Bracket with grouping function | Automatic sizing of brackets by putting left and right (left . . . right . . . ) up front, e.g., left(a over b right) or left lceil . . . right lceil. This way round, square, double square, single, double, single, curley, pointed, and operator brackets can be changed. |  |
| ( | Bracket, also widowed, without grouping function | round left bracket | \( |
| ) | Bracket, also widowed, without grouping function | Normal round right bracket | \) |
| [ | Bracket, also widowed, without grouping function | Normal left square bracket | \[ |
| ] | Bracket, also widowed, without grouping function | Normal right square bracket | \] |
| { | Bracket, also widowed, without grouping function | Left curly bracket | \lbrace, or, \{ |
| } | Bracket, also widowed, without grouping function | Right curly bracket | \lbrace, or, \} |
| < | Bracket, also widowed, without grouping function | Left pointed bracket | \langle |
| > | Bracket, also widowed, without grouping function | Right pointed brackets | \rangle |
| \|... | Bracket, also widowed, without grouping function | Left vertical line | \lline |
| ...\| | Bracket, also widowed, without grouping function | Right vertical line | \rline |
| \|\|... | Bracket, also widowed, without grouping function | Left double line | \ldline |
| ...\|\| | Bracket, also widowed, without grouping function | Right double lines | \rdline |
| ⌊ | Bracket, also widowed, without grouping function | Left line with lower edge | \lfloor |
| ⌋ | Bracket, also widowed, without grouping function | Right line with lower edge | [r]floor |
| ⌈ | Bracket, also widowed, without grouping function | Left line with upper edge | \lceil |
| ⌉ | Bracket, also widowed, without grouping function | Right line with upper edge | \rceil |
| □□ | Indexes and exponents (sub-and superscript) | Right index | _, or sub, or rsub |
| □□ | Indexes and exponents (sub-and superscript) | Right exponent | ^, or sup, or rsup |
| □□ | Indexes and exponents(sub-and superscript) | Left index | lsub |

TABLE 1-continued

| Symbol Presented in Formula | Type | Description | Example of text formula instruction |
|---|---|---|---|
| ▫▫ | Indexes and exponents (sub-and superscript) | Left exponent | lsup |
| | Indexes and exponents (sub-and superscript) | Exponent directly above a character | csup |
| | Indexes and exponents (sub-and superscript) | Index directly below a character | csub |
| | Formatting | Horizontal alignment -- left, center, right | alignl, or alignc, or alignr |
| | Formatting | Space/Blank | ~ |
| | Formatting | Small space/small blank | |
| | Formatting | Newline | newline |
| ▫ ▫ ▫ ▫ ▫ | Formatting | Binom | binom |
| | Formatting | Stack | stack{x#y#z} |
| ▫▫ ▫▫ | Formatting | Matrix | matrix{a#b##c#d} |
| ’ | Attribute with fixed character width | Accent to the right above a character | acute a |
| — | Attribute with fixed character width | Horizontal bar above a character | bar a |
| ˘ | Attribute with fixed character width | Upside down roof above a character | breve a |
| ˇ | Attribute with fixed character width | Upside down roof | check |
| ° | Attribute with fixed character width | Circle above a character | circle a |
| . | Attribute with fixed character width | Dot above a character | dot a |
| .. | Attribute with fixed character width | Two dots above a character | ddot a |
| ... | Attribute with fixed character width | Three dots above a character | dddot a |
| ‘ | Attribute with fixed character width | Accent to the left above a character | grave a |
| ^ | Attribute with fixed character width | Roof above a character | hat a |
| ~ | Attribute with fixed character width | Tilde above a character | tilde a |
| → | Attribute with fixed character width | Vector arrow above a character | vec a |
| ▫ | Attribute with variable character width | Horizontal bar below a character | underline a |
| ▫ | Attribute with variable character width | Horizontal bar above a character | overline a |
| ▫ | Attribute with variable character width | Horizontal bar through a character | overstrike a |
| → | Attribute with variable character width | Wide vector arrow, adjusts to the character size | widevec a |
| ~ | Attribute with variable character width | Wide tilde, adjusts to the character size | widetilde |
| ^ | Attribute with variable character width | Wide roof, adjusts to the character size | widehat |
| | Font attributes | Italics | ital |
| | Font attributes | Remove italics | nitalic |
| | Font attributes | Bold | bold |
| | Font attributes | Remove bold | nbold |
| | Font attributes | Phantom character | phantom |
| | Font attributes | Command to change characters; first the font name (sans, serif, or attributes fixed) is entered, then the characters to be changed are entered. | font sans a |
| | Font attributes | Command to change the font size; first the size is entered, then the characters to be changed are entered; for the entered sizes arguments following the pattern n, +n, −n *n or /n can be indicated; size +n and −n are changed in points(pt); a percentage change to e.g. 17% must be entered as *1.17 | size *2 font sans a |

TABLE 1-continued

| Symbol Presented in Formula | Type | Description | Example of text formula instruction |
|---|---|---|---|
| | Font attributes | The command to change the character color; first color green the color name (blank, white, cyna, magenta, red, blue, green and yellow) is entered, then the characters to be changed are entered. | color green abc |

In addition to easy generation of a formula, the present invention includes an easy way to edit a data object like a mathematical formula. The object is entered by, e.g., a mouse click, on the object, and then is reconverted into the text formula instruction containing the text instruction symbols. The user edits the object by editing the text formula instruction, selects the edited text formula instruction again, and converts the same again into a data object, as described above. The editing operation can thus be carried out easily without entering a special tool like a formula editor.

Further, those of skill in the art will appreciate that while memory 311C is illustrated as one unit that can include both volatile memory and non-volatile memory, in most computer systems, memory 311C is implemented as a plurality of memory units. In more general terms, method 205 is stored in a computer readable medium, and when method 205 is loaded from the computer readable medium into a memory of a device, the device is configured to be a special purpose machine that executes method 205. Alternatively, the application used to execute method 220, e.g., application 319, may be stored in one computer readable medium, and method 230 stored in another computer readable medium.

Also, herein, a computer program product comprises a medium configured to store or transport computer readable code for method 205, method 220, and/or method 230 or in which computer readable code for method 205, method 220, and/or method 230 is stored. Some examples of computer program products are CD-ROM discs, ROM cards, floppy discs, magnetic tapes, computer hard drives, servers on a network and signals transmitted over a network representing computer readable program code.

Figure 3A:
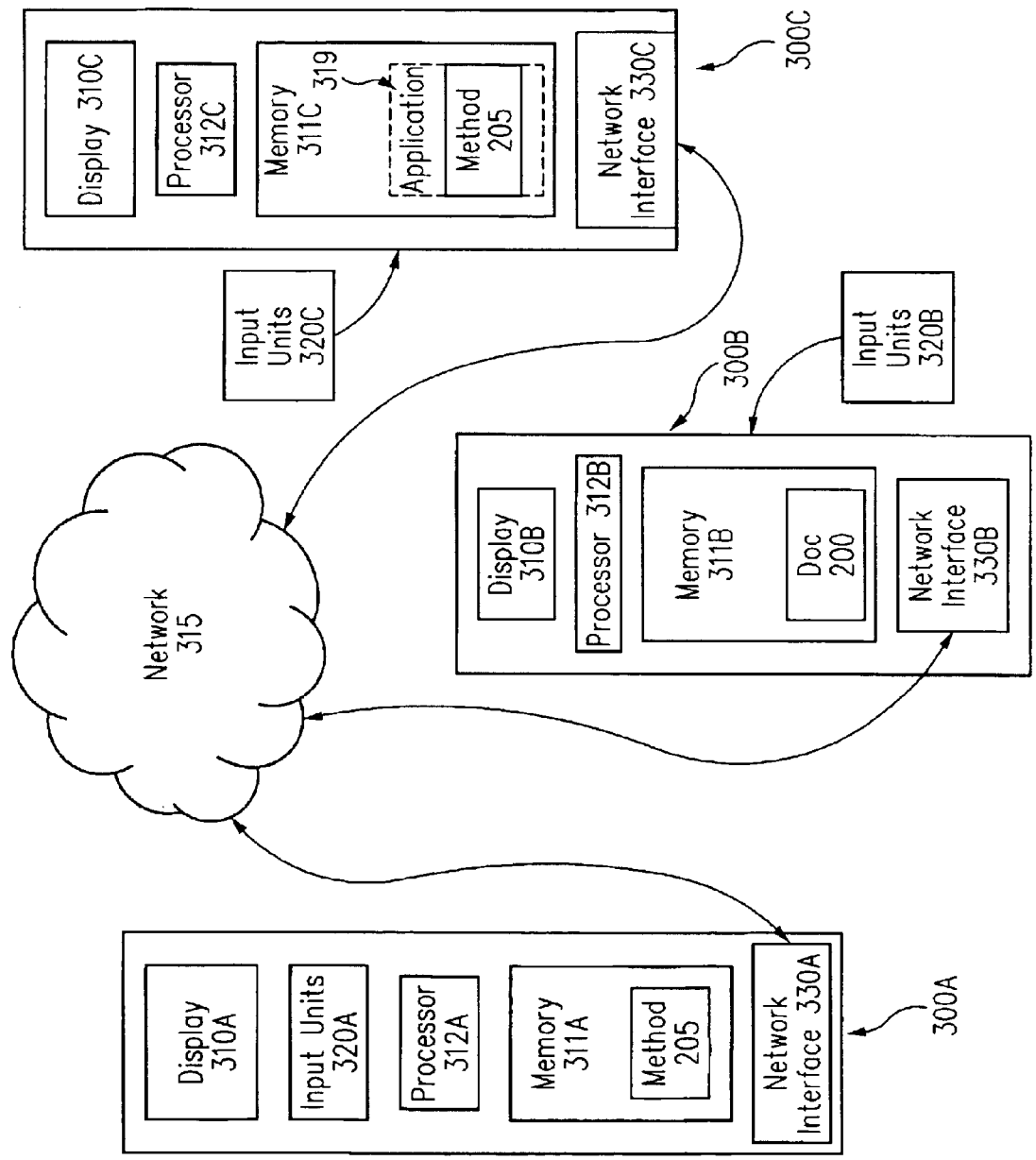
FIG. 3A is a schematic illustration of a computer system to which the present invention may be applied.

As illustrated in FIG. 3A, this storage medium may belong to computer system 300C itself. However, the storage medium also may be removed from computer system 300C. For example, method 205 may be stored in either memory 311A or 311B that is physically located in a location different from processor 312C. The only requirement is that processor 312C is coupled to memory. This could be accomplished in a client-server system, e.g. system 300C is the client and system 300B is the server, or alternatively via a connection to another computer via modems and analog lines, or digital interfaces and a digital carrier line.

For example, memory 311C could be in a World Wide Web portal, while the display unit and processor are in a personal digital assistant (PDA), or a wireless telephone, for example, system 300A. Conversely, the display unit and at least one of the input devices could be in a client computer, a wireless telephone, or a PDA, while the memory and processor are part of a server computer on a wide area network, a local area network, or the Internet. In this paragraph, method 205 that includes the application used to perform method 220, as well as method 230 was considered. However, those of skill in the art will appreciate that a similar description can be made for only method 220 and for only method 230. Accordingly, this description and that which follows is not repeated for each of the possible combinations and permutations for using and storing methods 220 and 230.

More specifically, computer system 300C, in one embodiment, can be a portable computer, a workstation, a two-way pager, a cellular telephone, a digital wireless telephone, a personal digital assistant, a server computer, an Internet appliance, or any other device that includes the components shown and that can execute method 205. Similarly, in another embodiment, computer system 300C can be comprised of multiple different computers, wireless devices, cellular telephones, digital telephones, two-way pagers, or personal digital assistants, server computers, or any desired combination of these devices that are interconnected to perform, method 205 as described herein. See, for example, FIG. 3A.

Accordingly, a computer memory refers to a volatile memory, a non-volatile memory, or a combination of the two in any one of these devices. Similarly, a computer input unit and a display unit refers to the features providing the required functionality to input the information described herein, and to display the information described herein, respectively, in any one of the aforementioned or equivalent devices.

In view of this disclosure, method 230 and method 220 can be implemented in a wide variety of computer system configurations. In addition, method 205 could be stored as different modules in memories of different devices. For example, method 205 could initially be stored in a server computer, and then as necessary, a module of method 205 could be transferred to a client device and executed on the client device. Consequently, part of method 205 would be executed on the server processor, and another part of method 205 would be executed on the client device. In view of this disclosure, those of skill in the art can implement the invention of a wide-variety of physical hardware configurations using an operating system and computer programming language of interest to the user.

Figure 3B:
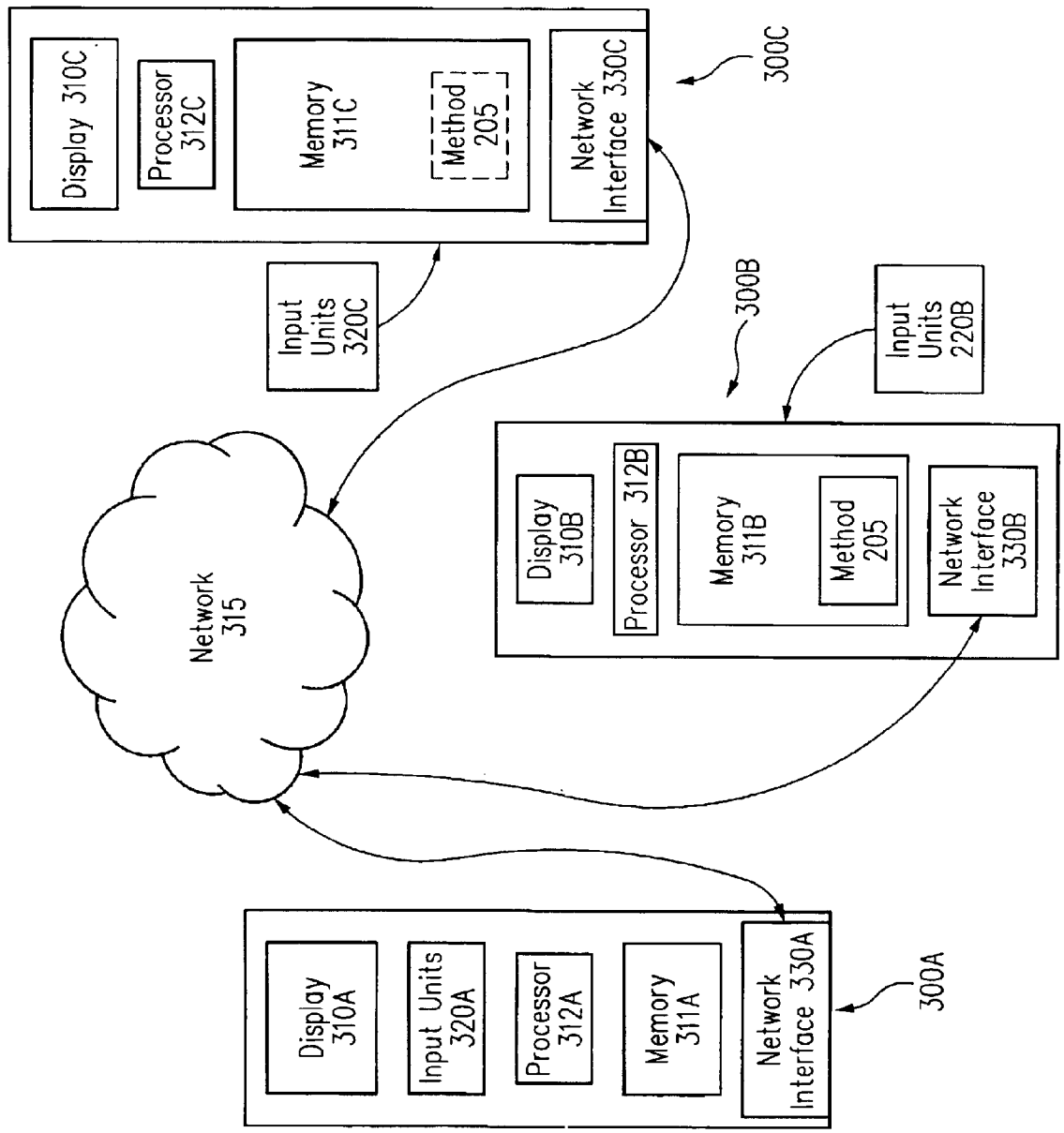
FIG. 3B is a schematic illustration of a client-server computer system in which the present invention may be transferred and/or downloaded.

In yet another embodiment illustrated in FIG. 3B, method 205 is stored in memory 311B of system 300B. Stored method 205 is transferred, over network 315 to memory 311C in system 300C. In this embodiment, network interfaces 330B and 330C can be analog modems, digital modems, or a network interface card. If modems are used, network 315 includes a communications network, and method 205 is downloaded via the communications network.

While the invention has been particularly shown with reference to a preferred embodiment thereof, it will be understood by those skilled in the art that various other changes in the form and details may be made therein without departing from the spirit and scope of the invention.

I claim:

1. A method of a user interactively inserting a formula into a computer-generated document without using an equation editor by said user comprising:

receiving text interactively entered, by said user, into said computer-generated document;

receiving an interactively selected portion of said text that was highlighted by said user, said user selected text portion including at least one text instruction symbol and at least one text character, which is not included in said text instruction symbol, wherein said user selected text portion represents a formula;

converting said user-selected text into a data object representing said formula, wherein said data object comprises said formula and further wherein said at least one text character which is not included in said text instruction symbol remains unchanged during the converting; and returning said data object insertion into said computer-generated document.

2. The method of claim 1 wherein the formula comprises a mathematical formula.

3. The method of claim 1 wherein the data object comprises at least one Greek character.

4. The method of claim 1 further comprising:

inserting the returned data object into the computer-generated document at a position of the user selected text portion.

5. The method of claim 4 wherein content surrounding the data object has a format, and said method further comprises formatting the returned data object using said format.

6. The method of claim 1 further comprising storing the data object with the computer-generated document.

7. The method of claim 1 wherein the data object is reconvertible into the text portion representing the data object.

8. The method of claim 1 wherein said method is downloaded.

9. The method of claim 1 wherein said method is stored on a first computer system and said computer-generated document is stored on a second computer system.

10. A computer program product embodied on a computer-readable medium for inserting a data object into a computer-generated document, the computer program product comprising program code for a method of a user interactively inserting a formula into a computer-generated document without using an equation editor by said user, said method comprising:

receiving text interactively entered, by said user, into said computer-generated document;

receiving an interactively selected portion of said text that was highlighted by said user, said user-selected text portion including at least one text instruction symbol and at least one text character, which is not included in said text instruction symbol, wherein said user selected text portion represents a formula;

converting said user-selected text into a data object representing said formula, wherein said data object comprises said formula and further wherein said at least one text character which is not included in said text instruction symbol remains unchanged during the converting; and returning said data object insertion into said computer-generated document.

11. The computer program product of claim 10 wherein the formula comprises a mathematical formula.

12. The computer program product of claim 10 wherein the data object comprises at least one Greek character.

13. The computer program product of claim 10 further comprising computer code for:

inserting the returned data object into the computer-generated document at a position of the user selected text portion.

14. The computer program product of claim 13 wherein content surrounding the data object has a format, and said computer program product further comprises formatting the returned data object using said format.

15. The computer program product of claim 10 further comprising storing the data object with the computer-generated document.

16. The computer program product of claim 10 wherein the data object is reconvertible into the text portion representing the data object.

17. A computer system comprising:

a processor; and a memory, coupled to said processor, storing instructions for a method of a user interactively inserting a formula into a computer-generated document without using an equation editor by said user, where upon execution of said instructions on said processor, said method comprises:

receiving text interactively entered, by said user, into said computer-generated document;

receiving an interactively selected portion of said text that was highlighted by said user, said user selected text portion including at least one text instruction symbol and at least one text character, which is not included in said text instruction symbol, wherein said user selected text portion represents a formula;

converting said user-selected text into a data object representing said formula, wherein said data object comprises said formula and further wherein said at least one text character which is not included in said text instruction symbol remains unchanged during the converting; and returning said data object insertion into said computer-generated document.

18. The computer system of claim 17 wherein said memory is coupled to said processor by a network.

* * * * *